July 28, 1964 H. H. HARTZELL ETAL 3,142,493
EQUALIZER BEAM FOR TRUCK TRAILERS
Filed June 11, 1962
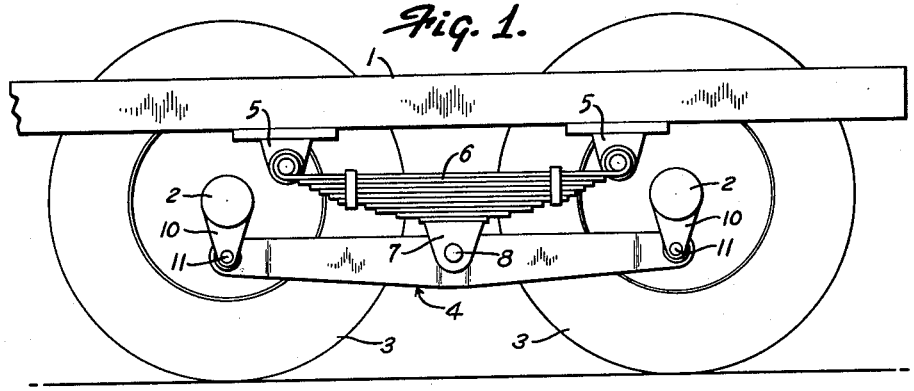
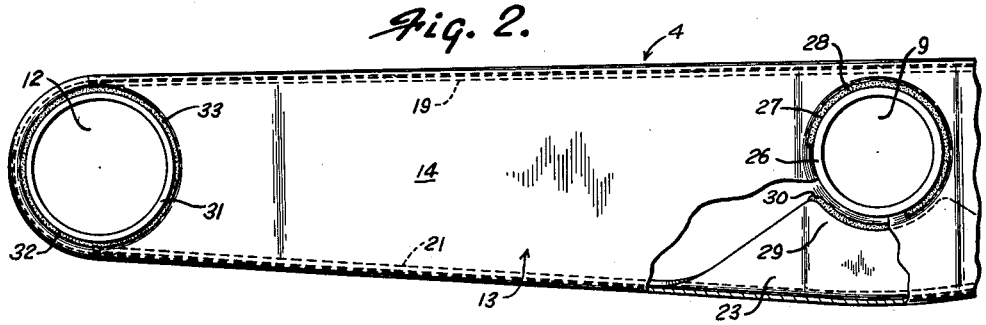
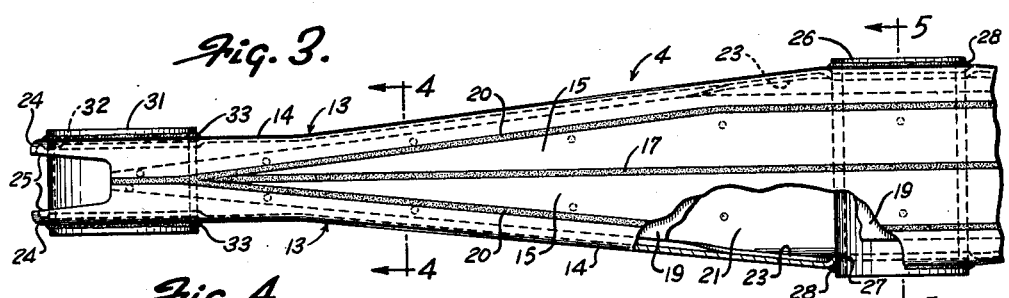
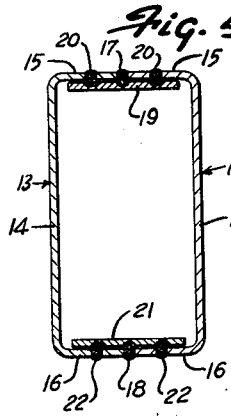
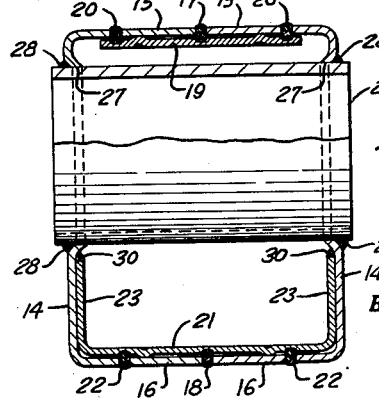
INVENTORS.
HERSCHELL H. HARTZELL
HAROLD E. VICKERMAN
BY
Howard J. Barnett
ATTORNEY

United States Patent Office 3,142,493
Patented July 28, 1964

3,142,493
EQUALIZER BEAM FOR TRUCK TRAILERS
Herschell H. Hartzell, Brown Deer, and Harold E. Vickerman, Milwaukee, Wis., assignors to A. O. Smith Corporation, Milwaukee, Wis., a corporation of New York
Filed June 11, 1962, Ser. No. 201,361
1 Claim. (Cl. 280—104.5)

The present invention is directed to an improved equalizer beam construction for dual-wheel truck trailer suspension systems, and more particularly to an equalizer beam fabricated from relatively thin gage metal stampings.

The construction herein described was developed as an improvement on earlier equalizer beams such as that described in U.S. Patent 3,007,713, issued on November 7, 1961, and assigned to a common assignee herewith. Experience indicated that a stronger equalizer beam was required for extremely severe loading conditions, in which the equalizer beam is subjected to greater deflection loading.

In the usual dual-wheel tandem suspension, the midportion of the equalizer beam is pivotally connected to a spring, which is attached directly to the vehicle frame. The ends of the equalizer beam are connected to forward and rearward tandem axles, on which the vehicle wheels are mounted. A road impact received under the forward wheel tends to bend the forward end of the equalizer beam upwardly, while causing the rear wheel to press downwardly against the road surface. It is very important, therefore, that the equalizer beam be capable of withstanding heavy deflection loading, and it is also important that the equalizer beam be as light as possible to thereby increase the load capacity of the truck, since all states impose highway load limits on truckers.

The equalizer beam of this invention has proved extremely serviceable even under the most severe deflection loading conditions. It comprises a pair of relatively light-gage channel members disposed to define a box section and butt-welded together. A pair of doubler plates are disposed inside the box section in lapping relation with the respective butt welds. The doubler plates are welded to the adjacent flanges and provide additional reinforcement, both for the welds between the channel members, and for the composite beam when subjected to deflection loading. In addition, the bottom doubler plate defines a saddle-like mid-portion inside the equalizer beam to reinforce the portion of the beam which is connected to the spring. The beam is largest at this mid-portion, where stresses originating at both wheels are concentrated, and tapers down forwardly and rearwardly to the wheel attachment points.

Longitudinally aligned, transversely extending eyes are disposed at the ends and mid-section of the beam, and connect to supporting means depending from the axles and the vehicle frame, respectively. Each eye is formed of a bearing sleeve inserted through aligned openings provided in the web sections of opposed channel members.

The accompanying drawings illustrate the best mode presently contemplated for carrying out the invention.

In the drawings:

FIGURE 1 is an interior diagrammatic side elevational view of a vehicle suspension incorporating the equalizer beam of this invention;

FIG. 2 is an enlarged side elevational view of a portion of the beam with parts broken away for clarity;

FIG. 3 is an enlarged top plan view of a portion of the beam;

FIG. 4 is a section along line 4—4 of FIG. 3; and

FIG. 5 is a section along line 5—5 of FIG. 3.

The drawings illustrate a dual axle vehicle which includes a pair of frame members 1 extending longitudinally along opposite sides of the vehicle and a pair of transversely extending tandem axles 2 disposed beneath the frame members 1. Each of the axles 2 rotatably supports a pair of wheels 3.

The vehicle load is transmitted equally to axles 2 and wheels 3 by a pair of equalizer beams 4 mounted one on each side of the vehicle. Each beam is of identical construction and connects to the vehicle and axles in a similar manner.

A pair of longitudinally spaced brackets 5 are secured to each frame member 1 to provide attachment means for a leaf spring 6 having a downwardly extending hanger 7, which is secured to the lower side of the spring. The central portion of the beam 4 is pivotally secured to the hanger 7 by a pin 8 which extends through aligned openings in the hanger 7 and through an eye 9 in the beam.

Each end of beam 4 is pivotally secured to the lower end of a bracket 10 rotatably secured to axle 2, inwardly from wheels 3, by a pin 11 which extends through aligned openings in bracket 10 and through an eye 12 in beam 4.

The beam 4 comprises a pair of abutting channel members 13, each having a web 14 and a pair of upper flanges 15, and lower flanges 16. The flanges 15 and 16 are disposed in abutting relationship to define a box section member, and are secured together by means of continuous butt welds 17 and 18, respectively.

In addition, a top reinforcing doubler plate 19 is disposed beneath and adjacent the two upper flanges 15, being secured thereto by the welds 17 along its longitudinal median, and by two peripheral burn-through seam welds 20. The doubler plate 19 provides a reinforcement means which greatly strengthens the top portion of the beam 4.

A bottom doubler plate 21 is disposed within the beam 4 and adjacent the two bottom flanges 16, being secured thereto by the butt weld 18, and by a pair of peripheral burn-through seam welds 22. The bottom doubler plate 21 reinforces the bottom portion of the beam 4.

The bottom doubler plate 21 also includes a pair of saddle-like flanges 23 in the mid-portion thereof. The flanges 23 extend upwardly inside the webs 14 of the channel members 13 to provide additional reinforcement in the portion of the beam 4 subjected to the greatest stress in the vicinity of the central transverse eye 9, where the beam 4 is secured to the hanger 7.

The channel members 13 are formed from relatively thin gage plates, and taper to a smaller cross section in both web and flange from the thicker central portion thereof. The webs 14 each terminate in transversely enlarged rounded end portions 24. The taper of members 13 provides a shaped beam having maximum sectional area in the mid-section where loads are at a maximum and a gradually decreasing sectional area in a direction toward either end of the beam to adjust for decreasing loads in those areas. The beam thus provides for the most efficient utilization of beam material to especially withstand severe deflection loading. Because the tandem axles provide lateral rigidity, the taper is more severe when viewed from the top as compared to the degree of taper of the sides, which are the webs 14.

The outer ends of the flanges 15 and 16, terminate in U-shaped notches 25 which facilitate removal of the mandrel after the doubler plates 19 and 21 have been welded in place inside the beam 4.

The eye 9 in the beam 4 is provided with a bearing sleeve 26 for connection to the hanger 7 of frame 1. The bearing sleeve 26 is disposed in a pair of aligned openings 27 in the mid-portion of the opposed webs 14 of the channel members 13. The bearing sleeve 26 is rigidly supported in the openings 27 by a circumferential fillet weld 28 connecting the ends of the sleeve 26 to the respective webs 14 adjacent the openings 27. In addition, the flanges 23 of the bottom doubler plate 21 each have a curved saddle portion 29 which extends under the sleeve 26 immediately below the openings 27. The saddle portions 29 of the flanges 23 are fillet welded to the inside surfaces of the webs 14 as indicated at 30.

The eyes 12 at the ends of the beam 4 are provided with similar sleeves 31, which are inserted in openings 32 provided in the end portions of the webs 14. Circumferential fillet welds 33 secure the sleeves 31 to the webs 14.

Sleeves 26 and 31 provide bearing surfaces for rotatable pins 8 and 11, respectively, and increase the overall rigidity of the beam 4.

To fabricate the beam 4, the doubler plates 19 and 21 are first welded to the flanges 15 and 16 of a first channel member 13 so that half of their surfaces extend laterally out beyond the flanges 15 and 16. A second channel member 13 is then fitted over the laterally extended portions of the doubler plates 19 and 21 so that the edges of the flanges 15 and 16 of both channel members 13 are disposed in abutting relationship. The butt welds 17 and 18 are then made to connect together the adjacent top and bottom flanges 15 and 16, respectively, thereby forming a box-section beam 4. The doubler plates 19 and 21 serve as a chill for the butt welding operation and are also secured to the flanges 15 and 16 by means of peripheral burn-through welds 20 and 22, respectively.

The welds 30 between the saddle portion 29 of the bottom doubler plate 21 and the webs 14 can both be made through the openings 27, or the first weld 30 can be made after the doubler plate 21 and the first channel member 13 are assembled, and before the two channel members 13 are assembled together.

The equalizer beam of this invention provides an extremely lightweight, strong component for a dual-wheel, tandem axle vehicle suspension. This beam successfully withstands extreme stresses due to excessive deflectional loading. In addition, the manufacturing cost of this beam is significantly reduced, because the doubler plate construction greatly facilitates a higher percentage of acceptable, more closely controlled welds.

Various modes of carrying out the invention are contemplated as being within the scope of the following claim particularly pointing out and distinctly claiming the subject matter regarded as the invention.

We claim:

An equalizer beam for a tandem axle vehicle suspension having a plurality of wheels comprising a first channel member having a web and a pair of flanges, a second channel member having a web and a pair of flanges, said first and second channel members being disposed with their flanges in abutting relation to define a box-section member having its top and bottom surfaces defined by said flanges, and having a bushing extending through aligned openings in the side surfaces of said box section member weld means joining the abutting flanges together, an upper reinforcing plate disposed inside said box-section member and flatwise against the top surface thereof, a lower reinforcing plate disposed inside said box-section member and flatwise against the top surface thereof, said lower reinforcing plate having flange-like extensions intermediate its ends extending perpendicularly from said lower reinforcing plate into contact with the bushing and secured thereto, to provide additional localized reinforcement to the side portions of said box-section member, and second weld means securing said upper and lower reinforcing plates to the respective top and bottom surfaces of said box-section member.

References Cited in the file of this patent

UNITED STATES PATENTS

| | | |
|---|---|---|
| 1,643,577 | Dornier | Sept. 27, 1927 |
| 2,173,525 | Wallace | Sept. 19, 1939 |
| 3,007,713 | Schilberg | Nov. 7, 1961 |

FOREIGN PATENTS

| | | |
|---|---|---|
| 910,988 | Germany | May 10, 1954 |
| 196,819 | Austria | Mar. 25, 1958 |